United States Patent [19]

Kowal et al.

[11] 3,996,561
[45] Dec. 7, 1976

[54] PRIORITY DETERMINATION APPARATUS FOR SERIALLY COUPLED PERIPHERAL INTERFACES IN A DATA PROCESSING SYSTEM

[75] Inventors: Krzysztof Kowal, Framingham; Leon S. Malone, Jr., Franklin, both of Mass.

[73] Assignee: Honeywell Information Systems, Inc., Waltham, Mass.

[22] Filed: Apr. 23, 1974

[21] Appl. No.: 463,336

[52] U.S. Cl. .......................................... 340/172.5
[51] Int. Cl.² .......................................... G06F 3/04
[58] Field of Search ................... 340/172.5; 445/1

[56] References Cited

UNITED STATES PATENTS

| | | | |
|---|---|---|---|
| 3,752,932 | 8/1973 | Frisone | 179/15 AL |
| 3,818,447 | 6/1974 | Craft | 340/172.5 |
| 3,829,839 | 8/1974 | Jeane | 445/1 |
| 3,832,692 | 8/1974 | Henzel et al. | 340/172.5 |
| 3,863,220 | 1/1975 | Osawa et al. | 179/15 AL |

*Primary Examiner*—Gareth D. Shaw
*Assistant Examiner*—John P. Vandenburg
*Attorney, Agent, or Firm*—John S. Solakian

[57] ABSTRACT

A priority determination technique for use in a data processing system having a data processor coupled with a plurality of peripheral interface logic elements or boxes for transferring data to such boxes serially by bit, such interface boxes coupled along a daisy chained serial data transfer bus. Each of such boxes is coupled to interface with one or more peripherals for transferring data with the bus. Each interface box includes a priority network including a shift register for receiving bits of the data, wherein a mark bit is initially shifted through the shift register prior to the shifting of the data therein. The interface box address is compared with the respective stages of the shift register and generates a priority signal when the stage containing the mark bit compares with the box address. The priority signal is utilized to provide such highest priority interrupt requesting interface device with sole access for the next data transfer wth the processor.

14 Claims, 6 Drawing Figures

PRIORITY DETERMINATION APPARATUS FOR SERIALLY COUPLED PERIPHERAL INTERFACES IN A DATA PROCESSING SYSTEM

BACKGROUND OF THE INVENTION

The present invention relates to data processing systems and more particularly to priority determination techniques used in conjunction with data processing systems.

There are many systems in the prior art which have utilized priority systems. Typically in such systems, data, i.e., bits of a character are transferred in parallel to the respective peripherals for example from a host processor and priority is determined either by for example a location of the peripherals on a common bus or for example by a priority tree structure. Thus, some such priority systems provide a separate priority determination network from the actual data transfer bus in order to provide the priority determination.

In a system requiring a minimum number of cables for interfacing the data processor with a plurality of peripherals seeking access to a data path therebetween, and where the expense of such system must be minimized, it has become evident that some of these prior art techniques cannot be utilized. For example, in such a system where the number of cables must be minimal, data may be transferred bit by bit between the processor and the peripherals. Accordingly, the throughput of the system is minimized and it is thus necessary, in order to provide an acceptable response time in the system, for priority determination to be provided in an efficient manner while utilizing the data transfer bus. Further, the priority of the peripherals must be determined with minimal logic elements while providing relatively fast response.

It is accordingly an object of the invention to provide a priority determination apparatus for use in a data processing system which provides a fast response, which is relatively less complex in construction and relatively inexpensive compared to those priority determination systems of the prior art.

It is a further object of the invention to provide a priority determination technique for use in a data processing system which system includes a bus daisy chained between the processor and a plurality of interface boxes coupling the peripherals with the processor, so that the priority determination and data transfer are accomplished over the same bus.

SUMMARY OF THE INVENTION

The above stated objects are achieved by providing a priority determination apparatus in a system comprising a data processor, and a plurality of serially coupled peripheral interface boxes for receiving information serially by bit from such processor. The information being transferred is transferred in data transfer cycles and during each of such cycles a priority word is transferred and is used in determining the priority of such interface boxes, each of such interface boxes having coupled thereto one or more peripheral devices. Further, each of the interface boxes includes a shift register coupled for receiving information which is preceded by a mark bit coupled to be transferred through each of the stages of such register. The peripheral interface box address is provided for each such box and is compared with the location of the mark bit in such stages of the shift register until the number of the stage containing the mark bit compares with the box address, at which time a priority signal is generated if the priority word is present. A priority signal is utilized allowing the respective peripheral interface box and accordingly the peripheral device coupled therewith and requesting such interrupt to transfer data with the processor during the next succeeding data transfer cycle.

BRIEF DESCRIPTION OF THE DRAWINGS

The above and other objects of the present invention are achieved in the illustrative embodiment as described with respect to the figures in which.

DETAILED DESCRIPTION OF THE PREFERRED EMBODIMENT

Figure 1:
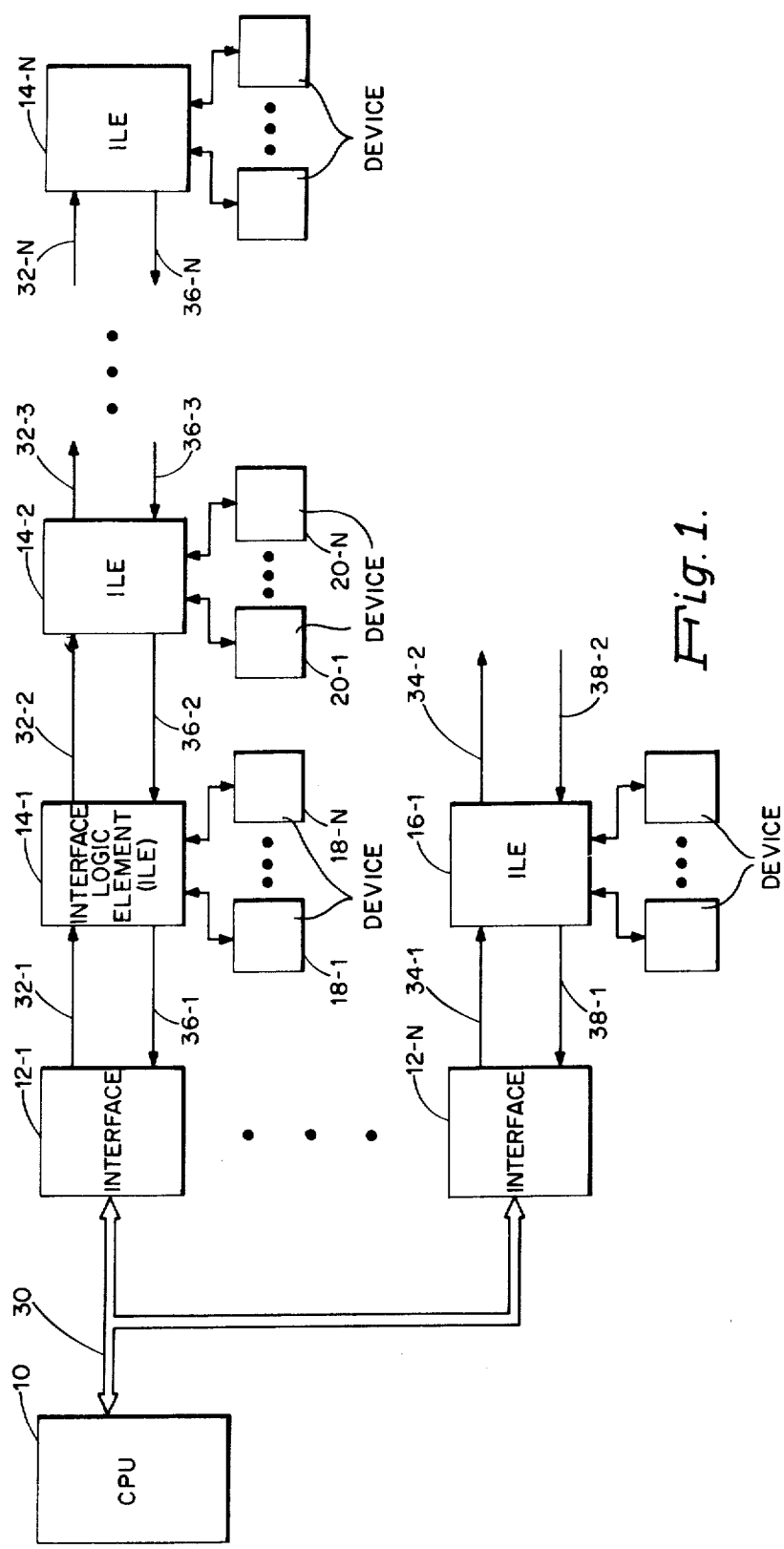
FIG. 1 illustrates the overall system of the present invention.

FIG. 1 illustrates an overall block diagram of the system in which the present invention is used. A processor 10 is coupled with at least one group of interface logic elements or boxes 14 by means of bus 30 and interface 12-1. Bus 30 is shown coupled to handle bidirectional transfer of data between the processor 10 and interface 12-1. Interface 12-1 is basically a parallel to serial converter so as to conver the parallel bits of a character received on bus 30 to serial bits to be transferred over bus 32-1 through bus 32-N which are daisy chained through interface boxes 14. Interface 12-1 is also coupled to convert bits serially received from bus 36 to bits in parallel or character form for transfer on bus 30. The system may include one or more data transfer paths, i.e., serial or daisy chained paths or busses 32 and 36 all of which allow the full duplex mode of operation of the present invention. In combination, busses 34 and 38 form another complete parallel data path. As indicated, several such parallel full duplex paths may be provided. Coupled with each one of these paths is an interface 12 so that there are interfaces 12 for the N such parallel paths. Coupled with each interface box 14-1 through 14-N as well as 16-1, etc., is one or more peripheral device ranging for example from transducers to display terminals, etc. and indicated in FIG. 1 as devices 18-1 through 18-N coupled with interface box 14-1, and devices 20-1 through 20-N coupled with interface 14-2 and so on.

Figure 2:
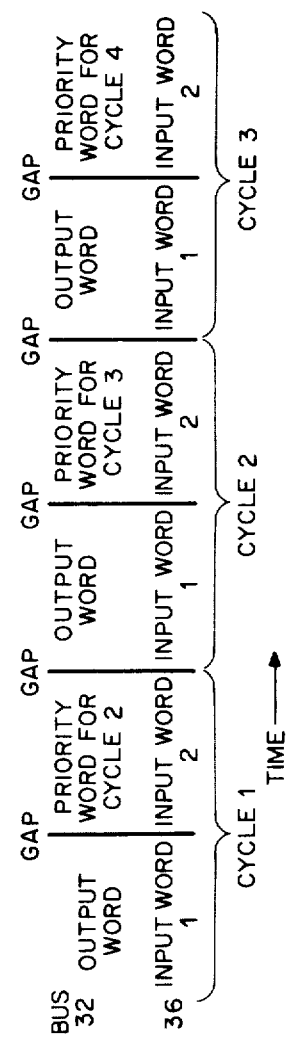
FIG. 2 illustrates the format of the data transfer cycles of the present invention.
Figure 3:
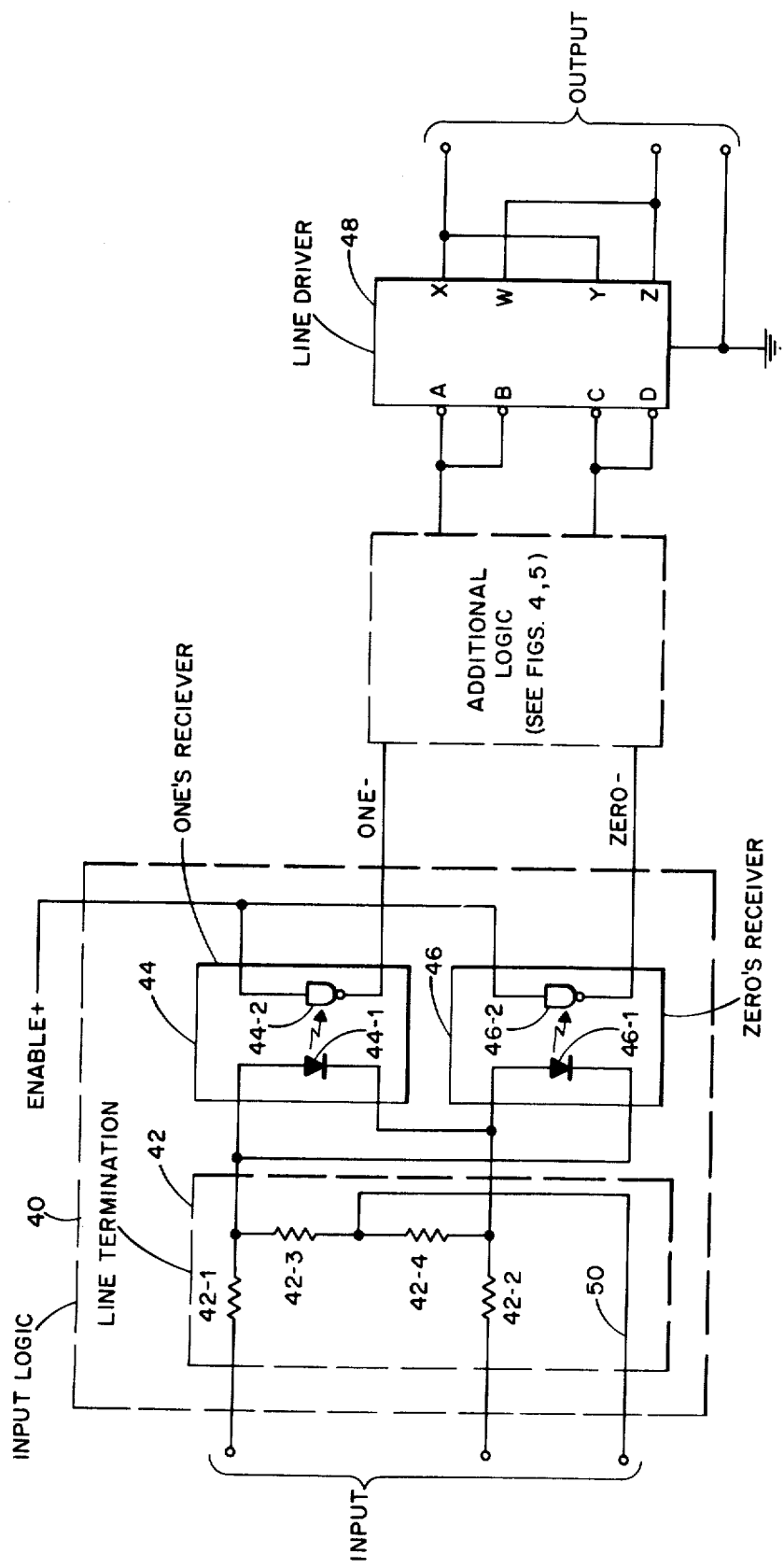
FIG. 3 represents receive and transmit logic used in each box for interfacing with the data transfer paths.
Figure 4A:
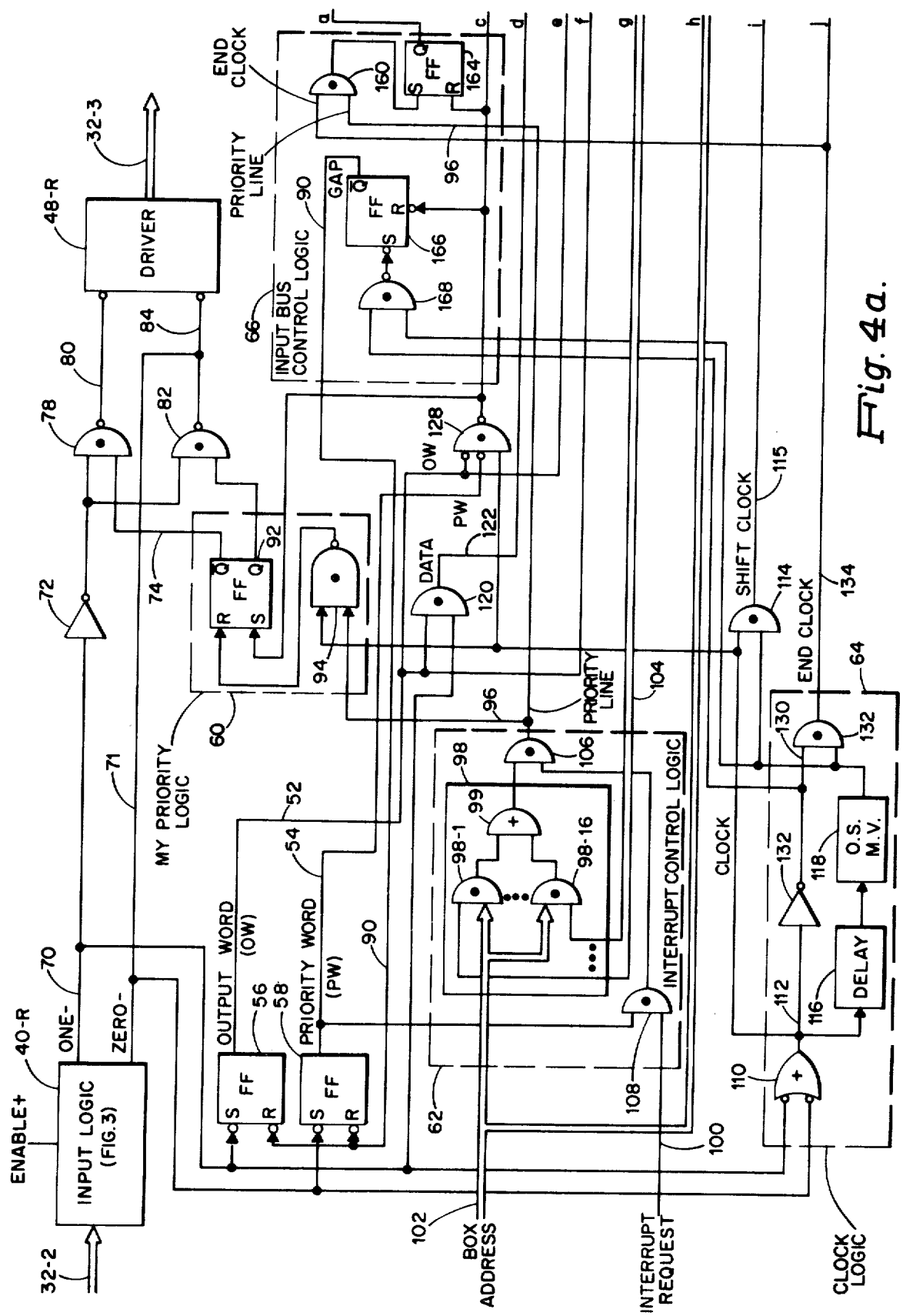
FIG. 4 illustrates the receive logic utilized in each box for receiving data from the data processor.
Figure 4B:
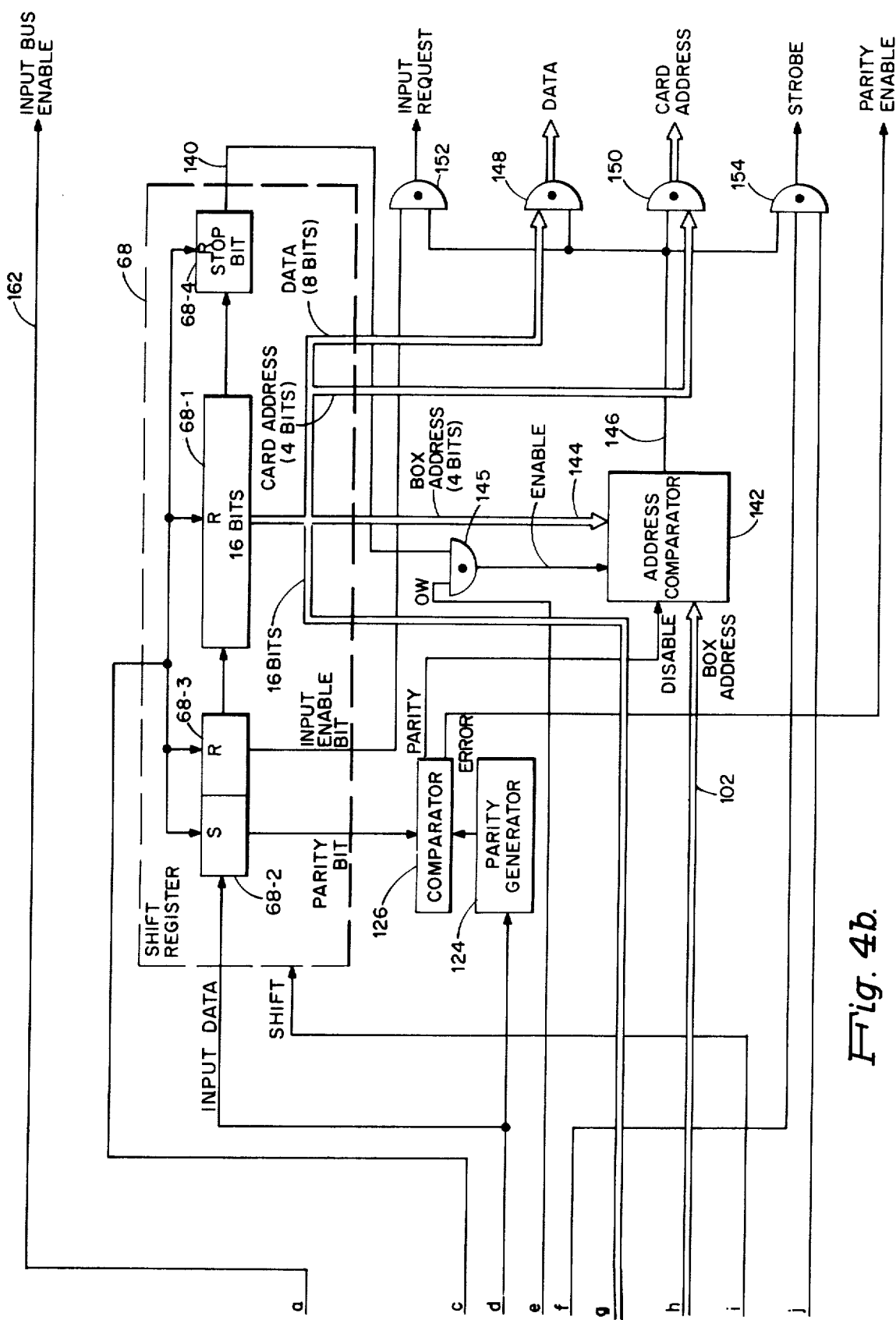
Figure 5:
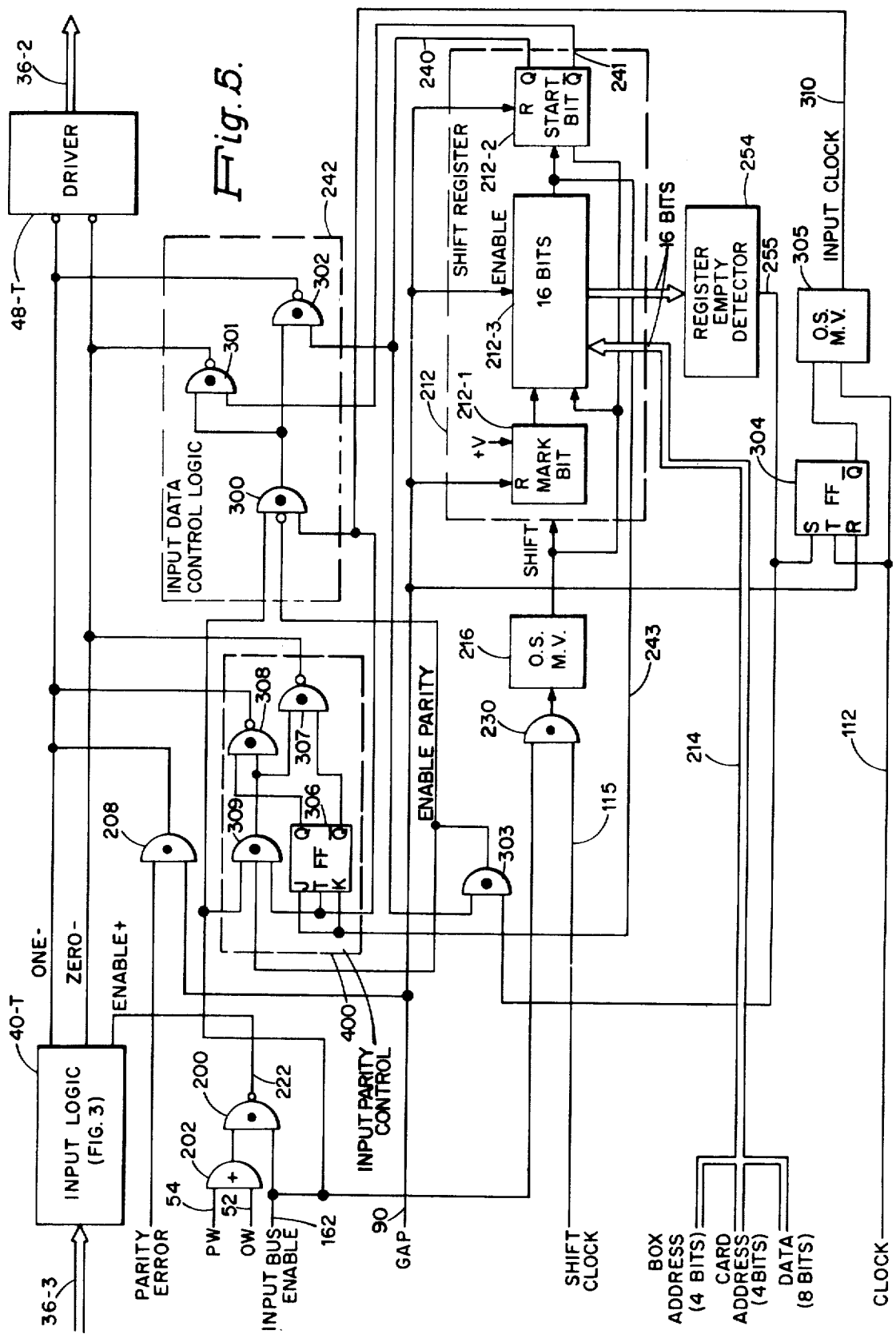
FIG. 5 illustrates the transmit logic used in connection with the present invention.

Each of the interface boxes comprises receive and transmit logic as shown in FIGS. 4 and 5 respectively, the common elements of which are shown in FIG. 3. Thus, data is serially transferred bit by bit from the interface 12-1 for example along bus 32-1 and is received by elements in each of the interface boxes 14-1 through 14-N for further transmittal to the respective peripheral device. For ease of explanation, the data transfer between processor 10 and interface boxes 14-1 through 14-N only will be discussed, it being understood that such operation is similar in the other data paths. In the transmit operation, data is transferred serially by bit along bus 36. The network is arranged so that the highest priority active device seeking to transmit data to the processor 10 blocks data transfer from other lower priority interface boxes until it has so transferred its data. During the receive operation, data from the processor 10 is received by each of the boxes 14-1 through 14-N and is rejected by all except the box which is addressed. Priority determination and acknowledgment is shown pictorially with respect to FIG. 2. As shown in FIG. 2, there are included cycles for the transfer of data. For ease of illustration, only three such cycles are shown. Between each cycle and subcycle, there is shown a gap to be hereinafter explained. On bus 32 for transfer of data from processor 10 to the interface boxes 14, the data will be transferred serially by bit along bus 32 so that in the first subcycle of each cycle, there will be transferred an output word and in the second subcycle there will be transferred a priority word. Thus, as will be seen more specifically, the priority word is used to determine the priority during the next cycle and accordingly during cycle 1 the priority word transferred on bus 32 would be used to determine priority for cycle 2 before cycle 2 occurs. Simultaneously and consistent with the full duplex operation of the present invention, at least two input words may be transferred along bus 36 to the processor 10 from one of the interface boxes 14. This transfer is shown in the form of two input words during each cycle.

As indicated hereinbefore, each interface box includes both receive and transmit logic. Common to such receive and transmit logic as shown in FIGS. 4 and 5 respectively, is the logic shown in FIG. 3 wherein the line termination and isolation units as well as a line driver is shown coupled with the additional logic. With reference to FIG. 3, there is shown input logic 40 which includes the line termination unit 42 and isolators 44 and 46. Also included in the logic of FIG. 3 is the line driver 48 which may be for example the device manufactured by Texas Instruments, Model Number 75,325. The input to the interface box would be received by line termination unit 42 and the output side of the bus would be coupled to the output line of line driver 48. Thus, with reference to interface 14-2 as shown in FIG. 1, the input would be bus 32-2 and the output would be bus 32-3 for the recieve portion of interface box 14-2 and the input would be bus 36-3 and the output would be bus 36-2 for the transmit portion of interface box 14-2. The line termination unit 42 may include for example four resistors used for impedance matching. A bit indicating a logical one would be determined in accordance with current flowing in such resistors through resistor 42-1 through the diode element in photocoupler 44, diode element 44-1 included in photocoupler 44, and basically back through resistor 42-2. This would be transferred by means of photocoupler 44 by a voltage zero at the output of the NAND gate 44-2. This voltage zero signal representing a logical one state would result because the ENABLE plus voltage which may be a positive voltage is essentially inverted via the NAND symbol as indicated by the circle at the output of the logic element so that when photocoupler 44 is turned on by such current through diode 44-1, the voltage zero is present on the ONE- line. Similarly for a logical zero representation, current will flow through resistor 42-2, diode element 46-1 of photocoupler 46 and back through resistor 42-1. This will turn on NAND gate 46-2 of photocoupler 46 to present a voltage zero representing a logical one on the ZERO- line. Thus, a logical one on the ONE- line represents a current in one direction and a logical one on the ZERO- line represents a current in the other direction as received by input logic 40. Resistors 42-3 and 42-4 operate in the impedance match, and provide a path to drain current of such currents to wire 50. Thus, the bus connecting each of the interface boxes, such as bus 32-2 would include three wires one of which would be a shield wire. The logical one and zero representations are provided and treated via additional logic as shown in FIGS. 4 and 5 and are applied to line driver 48 for transfer to the typical logic as shown in FIG. 3 of the next interface box, or to the interface 12. The line driver 48 of course need not be included in the last interface box 14-N included in one of the parallel data paths. similarly, the input logic 40 need not be included in the transmit logic also of the last device 14-N. Thus, signals on the ONE- and ZERO lines as shown in FIG. 3 would be represented by a voltage zero state thereon to identify the respective bit state received on its input. Should there be no current as is the case for a gap, as hereinafter explained, then both the ONE- and ZERO lines would have voltage one signals.

Now with reference to FIG. 4, the receive logic will be explained for one of the interface boxes, for example, interface box 14-2. The input logic 40 is coupled to receive the three wires of the single bus 32-2. The logic is also shown to include driver 48-R coupled to provide at its output the signals to bus 32-3. It should be noted that drivers 48-R as well as other elements respond to a voltage zero signal at the inputs if such inputs are indicated by the negation inputs as indicated by the circles.

The receive logic includes cerain major elements including the output word and priority word lines 52 and 54 which are enabled to so indicate such status by flip-flops 56 and 58 respectively. Also included in the logic of FIG. 4 is a MY priority logic 60 which is utilized to indicate to other interface boxes that this box has, during the transfer of the priority word, requested priority. The priority logic 60 is controlled by means of interrupt control logic 62 which enables the identification of the box requesting priority. Further logic included is the clock logic 64 which is used to generate clock signals used to determine the break between the cycles and subcycles. Also included is input bus control logic 66 in order to generate various bus control functions. A shift register 68 is also included for receiving bits of a word or character in serial form and further logic for transferring such data to the peripheral device by use of a card address which identifies the peripheral device.

More specifically, when line 70 has a voltage one signal thereon, this transfers to the logical one state by means of inverter 72. During the transfer of the priority word, which includes all logical one bits, the states of the two outputs of the MY priority logic 60 are respectively for line 74 a logical zero state and for line 76 a logical one state (during one bit time only if a priority request on line 96 is present). With a logical zero state at one input of NAND gate 78, and a logical one state at the other input, a voltage one state is presented on line 80 to one input of driver 48-R. The voltage one state is not a condition to enable driver 48-R because of the negation input as previously noted. Because both inputs to AND gate 82 are logical ones, accordingly, the output of AND gate 82 on line 84 is a logical one state, i.e. voltage zero, thereby enabling driver 48-R to indicate this voltage zero state to the other interface boxes further away from processor 10. The operation of the other interface boxes down the line will be explained in relationship to the discussion with respect to the interrupt control logic 62. As previously noted, the above discussion with respect to the logic 40 R, logic 60, NAND gate 78, and AND gate 82 and driver 48 R were connected with that situation in which a priority word is being transferred along the data paths and priority request on line 96 was present.

When data is being transferred along the data paths in the form of an output word, MY priority logic 60 is enabled so that a logical one state is present on line 74 and a logical zero state is present on line 76. With a logical one state on line 74 and with current representative of a logical one state bit received by input logic 40-R, the other input to NAND gate 78 will be a logical one thereby providing a voltage zero state on line 80 so that driver 48-R will present a current representative of a logical one state to the next interface box. It is noted that each of the interface boxes will receive such data, as well as the priority word, in their respective shift registers 68. When logical zero state signal is received and accordingly generated on line 71, then the logical zero signal on line 71 would be directly applied on line 84 to the lower input of driver 48-R for transfer to the other devices by way of a current indicating such logical zero state. It is noted that in such case, the signal state provided on line 71 would override the state of the output of AND gate 82.

With respect to the operation of the priority word indication on line 54 or the output word indication on line 52, in response to the logical one signal received on bus 32-2, flip-flop 56 is set, whereas if a logical zero is so received, flip-flop 58 is set. Both flip-flops 56 and 58 are reset by a signal on line 90 which indicates a gap condition. As indicated hereinbefore for the logical states on lines 74 and 76 of MY priority logic 60, and consistent with such logical states, the output of NAND gate 94 when enabled sets flip-flop 92 of logic 60. NAND gate 94 is fully enabled by means of priority line 96 and clock line 112. During the priority word time and when the subject interface box is requesting an interrupt, if it should be given the status of the highest priority active interface box, then the priority line 96 will be high so as to set flip-flop 92 to provide the logic states for lines 74 and 76 as indicated hereinbefore.

With respect to the interrupt control logic 62, there is included a plurality of gates in logic 98 which enables a high signal state, i.e., logical one state on line 96 when combined with the interrupt request signal on line 100. As indicated hereinbefore, such priority indication is indicated during the priority word time of the cycle. Each interface box includes its own box address which may be provided for example by a thumbwheel switch so as to set the states representing such box address which accordingly is provided on line 102. The box address which be initially four bits may be converted to sixteen individual bits representative of such four bits at the input of logic 98 so that each such gate 98 receives one line upon bus 102. Thus the box address on line 102 is coupled for receipt by each of AND gates 98-1 through 98-16 included in logic 98. There are sixteen bits included in register 68-1 of shift register 68 and because the system contemplates up to sixteen interface boxes along any given full duplex path. As a so-called start or mark bit is shifted along each one of the stages in register 68-1, as more specifically described hereinafter, such mark bit indication is respectively received at the inputs of AND gates 98-1 through 98-16. That is, when the mark bit is in the first location of register 68-1, the mark bit is received at the first AND gate 98-1 of logic 98 and so on until the mark bit is in the last location of register 68-1 when it is thus received at the last AND gate 98-16 of logic 98. When there is coincidence or comparison between a bit received on bus 104 from register 68-1 and the box address received on bus 102, then the respective one of the AND gates 98-1 through 98-16 generates a signal thereby enabling OR gate 99 to present a logical one signal to one input of AND gate 106 but only for the interface box generating such comparison. If there is an interrupt request by this particular interface box as indicated on line 100 and if, a priority word is being transferred, then AND gate 108 will be enabled to provide a logical one state to the other input of AND gate 106 thereby providing a logical one state on priority line 96. As discussed hereinbefore, line 96 is coupled to logic 60 and is also coupled to the input bus control logic 66 as shall be hereinafter discussed.

In order to shift information to the shift register 68, a shift pulse must be generated. In addition, a gap between cycles and subcycles must also be indicated. Clock logic 64 as well as logic 66 is provided for this purpose. In response to either a logical one or a logical zero on lines 70 and 71 respectively, OR gate 110 is coupled to provide a logical one signal on line 112. The logical one signal on line 112 is coupled to one input of AND gate 114 whose output is coupled to provide the shift clock, if the other input of AND gate 114 is also a logical one. In this case, the other input would be a logical one because the delay unit 116 combined with the one-shot multivibrator 118 combines to generate a logical one signal delayed by one bit time. Thus, the only time there will be a logical one indication on the output of one-shot multivibrator 118 without a logical one indication on line 112, will be when a gap is indicated. When a gap is indicated, i.e., when OR gate 110 receives only logical one states at both inputs, the logical level on line 112 will be a logical zero state.

The shift clock is generated, the data received on bus 32-2 is transferred via logic 40-R over line 70 to flip-flop 56 and to AND gate 120 which is enabled when there is an output word indication on line 52 thereby passing the complement of the logical state on line 70 to the input of shift register 68. The data so generated and provided at the input of shift register 68 on line 122 is also provided to parity generator 124 which is utilized to determine the parity for the 16 bits of the received word and to compare such parity by means of comparator 126 with the parity bit received in the first stage 68-2 of shift register 68. This aspect will be discussed hereinafter.

The clock signal on line 112 is also utilized to enable AND gate 128 in the absence of both an output word and a priority word as might be indicated on lines 52 and 54 respectively. In this manner, the flip-flop stages associated with shift register 68 are reset to indicate a logical zero except that the first stage or flip-flop 68-2 is set to indicate a logical one. This is the so-called start or mark bit. The parity bit will be contained in stage 68-2 at the conclusion of the transmittal of the respective word into all the stages of register 68. The signal at the output of AND gate 128 is also utilized to reset the logic of input bus control logic 66. When there is a gap condition, as indicated by the lack of current received on bus 32-2, then as indicated hereinbefore, the logical state of line 112 will be a zero such that the logical one state will be presented on line 130 by means of inverter 132. The logical one state on line 130 combined with the delayed logical one state from the previous bit time it the output of one-shot multivibrator 118, will fully enable AND gate 131 so as to generate an end clock signal on line 134. The end clock signal on line 134 is utilized in conjunction with logic 66 and is also used as a strobe for the receiving peripheral control card, coupled with the respective interface box.

As indicated hereinbefore, when an output word cycle signal is generated thereby enabling AND gate 120 to pass data to the input of register 68, such data is shifted in bit by bit by means of the shift clock generated at the output of gate 114. It is noted that just prior to this as indicated hereinbefore, the initial stage 68-2 of register 68 had been set with a logical one, i.e., the mark bit, and that all the other stages had been reset. Accordingly, as the shift pulses are received by register 58, the mark bit is shifted to the next stage 68-3 and so on until at the conclusion of the receipt of each bit of a word, stage 68-3 will include an input enable bit. In operation, the mark bit in stage 68-3 is received at the first stage of 16 bit register 68-1. When the mark bit is received at the last stage of shift register 68, a stop signal is generated on line 140 which together with the input enable bit in stage 68-3, enables AND gate 145 so as to enable address comparator 142. At this time, the stages of shift register 68 will contain the following, a parity bit in stage 68-2, an input enable bit in stage 68-3, the box address in the first four locations or stages of register 68-1, the card or peripheral address in the next four stages of register 68-1 and 8 bits of data in the next eight stages of register 68-1. The stage 68-4 will include the logical one indication of the mark bit.

The four bits of the box address are also received on line 144 at one input of address comparator 142 whose other input is coupled to receive the box address on bus 102. If there is a parity error as indicated by comparator 126 in response to the parity bit in stage 68-2 and the parity generated by generator 124, then address comparator 142 will be disabled. However, if in fact there is no disable signal and the mark bit in stage 68-4 indicates an enable condition, and should the box address on line 144 and the box address on line 102 compare, it being noted again that each of the interface boxes received the same information in their respective registers 68, then an enabling signal will be generated on line 146 so as to enable the data for example to be sent to the card addressed by means of AND gate 148. In order to enable the card address to be so sent to each of the cards or peripheral controllers attached to the interface box, AND gate 150 is enabled also in response to the signal on line 146. The strobe signal on line 146 is also utilized to enable AND gate 152 to send an input request signal to the receiving card and further is utilized to enable a strobe signal to be gated via AND gate 154 in response to the end clock signal on line 134 and in response to the output word signal on line 52 to the card addressed. Comparator 126 also generates the parity enable signal indicating a proper parity condition. The card addressed is accordingly provided with enabling signals such as input request, the strobe and parity enable signals so as to provide the data to the proper peripheral associated with the respective card address.

In order to control the input bus in association with the transmit logic, logic 66 is responsive to provide an input bus enable signal. The input bus enable signal is provided in response to the end clock signal as well as the priority signal on line 96 thereby enabling AND gate 160, which sets flip-flop 164, thus resulting in the input bus enable signal on line 162. The gap signal on line 90 is utilized for resetting flip-flops 56 and 58 and is generated by means of flip flop 166 which is set in response to a signal from AND gate 168 and in response to the logical one signal at the output of inverter 132 and a logical one signal at the output of one-shot multivibrator 118, thereby indicating a gap condition. Flip-flop 166 is reset thereafter.

Thus, in summary of the receive logic utilized in conjunction with each interface box of the present invention, by FIG. 4 there has been indicated input logic utilized for providing logical signals representative of the one- and zero- states, and apparatus for differentiating between the same as well as for providing an indication that neither the one nor the zero state is indicated but that in fact a gap is indicated. This accordingly provides a distinction between the priority word and the output word between the cycles and subcycles. Thus, during a priority word, which is all logical ones, the interface box requesting priority will inform other lower priority boxes that it is the highest priority interrupt requesting device by transferring all logical zeroes during the priority word time. This condition will be utitlized in conjunction with the transmit logic as shown in FIG. 5 for the next data transfer cycle. Thus, just before a priority word, the gap is indicated, the first bit or mark bit in shift register 68 is so indicated so as to indicate the highest priority interrupt requesting interface box which will be enabled to transfer data to the processor 10 during the next cycle of data transfer. When an output word time is indicated on line 52, then the data is also transferred into register 68 and the indication of the mark or stop bit in stage 68-4 of register 68 then allows the generation of gating pulses on line 146 so as to provide the data, etc. to the proper card corresponding to the addressed peripheral device. During the transmittal of the output word as well as the priority word during a data transfer cycle, input words are capable of being transferred to the processor as shall be seen with respect to FIG. 5.

Now referring to FIG. 5, there is shown the transmit logic for the same interface boxthat is shown in FIG. 4, namely, box 14-2. Coupled to the input of interface box 14-2 are the input lines 36-3 coupled to input logic 40-T and coupled to the output driver 48-T of interface box 14-2 output lines 36-2. The ENABLE plus input of input logic 40-T is shown to be provided by means of NAND gate 200 which receives its two inputs from OR gate 162 and INPUT BUS ENABLE 206. This is different from the receive logic, wherein the ENABLE plus was preferably a fixed, always present voltage. During the priority word or the output word as indicated on lines 54 and 52, as derived from the logic of FIG. 4, OR gate 202 presents a logical one signal to one input of NAND gate 200 which is fully enabled upon generation of an input bus enable signal on line 162 for the highest priority requesting device. Full enabling of NAND gate 200 thereby disables the ENABLE plus signal so that no data can be received from any lower priority interface boxes. That is, the input logic of FIG. 3 is not activated so that the photoconductive elements 44 and 46 cannot pass data and accordingly bus 36 is open circuited at that point. However, during the gap time as indicated by the full enabling of NAND gate 200, and even though there is a higher priority interrupt requesting device, the ENABLE plus input to logic 40-T is so generated so as to enable the input logic 40-T to pass parity error information. Thus, if there is a parity error (during an output word), the processor 10 will be so notified so that corrective action may be taken. Such parity error is placed on the ONE- line of the interface boxes by means of AND gate 208 which has as one input the parity error signal and which has as another input the gap signal received from the receive logic of FIG. 4. Thus, the parity error may be transferred during gap time to the processor 10 from any one of the interface boxes whereas during the priority word time or output word time, the interrupt requesting highest priority device opens the data transfer path between the lower priority devices and the data processor 10.

During the gap time, the first and last stages 212-1 and 212-2 of shift register 212 are reset to indicate logical zeros and the 16 bit register 212-3 is enabled to receive bits in parallel from bus 214. The information on bus 214 includes four bits identifying the box address which as indicated in FIG. 4 be supplied by means of logic levels generated by means of a thumbwheel switch or the like, and further, four bits identifying the card address, and eight bits of data to be transferred from the peripheral device to the data processor 10. This information is enabled into the 16 bits of register 212-3 upon the enabling of such register and finally upon the strobing of such information in response to the shift signal which is generated once during GAP time.

A shift signal is generated in response to the presence of an input bus enable signal on line 162 and the shift clock signal on line 115.

The shifting of bits through register 212 accomplished as follows. Firstly, the first stage 212-1 is set to provide logical one signals into successive stages of register 212-3 and finally stage 212-2 each time bits of data are shifted out of stage 212-2 on line 240. This is accomplished by means of the plus voltage (+V) which is indicated as a mark bit so that in effect the shift pulse received by register 212 generates a logical one signal therefrom. The data is transferred on lines 240 and 241 to the input data control logic 242. The data is then transferred to the ONE- and ZERO- lines respectively so as to be sent to processor 10 via data path 36-2.

With the input bus enable signal on line 162 true and register empty detector 254 as indicated by a signal on line 255, not true, the data will be clocked by means of the siganl on line 310 on the the ONE- or ZERO- lines through AND gate 300 and NAND gates 302 and 301 respectively. Thus when element 212-2, Q output, is at a logical one, both inputs to the gate 302 will be true resulting in line ONE- being not true. The complemented output line $\overline{Q}$ of flip-flop 212-2 is at logical zero which disables NAND gate 301.

When the register empty detector 254 is true, and the mark bit is in the START bit position 212-2, after sixteen shift pulses, the output of the gate 303 will become true disabling gate 300 in the input data control logic 242 and enabling gate 309 in the input parity control logic 400. The output of the gate 309 will enable NAND gates 308 and 307 thereby routing both outputs (Q and $\overline{Q}$) of the flip-flop 306 to the ONE- and ZERO- lines. Flip-flop 306 toggles, depending upon the state of the data appearing on line 243. The input clock generated via O.S. M.V. 305 will be inhibited by the $\overline{Q}$ line from flip flop 304 which becomes set after the parity bit is transmitted by means of logic 400.

As indicated hereinbefore, the first stage 212-1 of shift register 212 is utilized to provide logical ones to each of the stages of register 212-3 in addition to the last stage or start bit 212-2. When each of the 16 bits or stages of register 212-3 includes a logical one signal therein, register empty detector will detect this when the start bit in stage 212-2 also equals a logical one thereby enabling the register empty detector 254.

Thus, in summary of the operation of the transmit logic of FIG. 5, and with respect to the highest priority interrupt requesting device, the input logic 40-T thereof is disabled so that lower priority devices cannot transfer data to the processor 10. Further, parity error is allowed to be transferred to the processor 10 during the gap time so that any necessary correction may be initiated by processor 10. Further, it has been noted that the shift register 212 is coupled to receive 16 bits in parallel, such bits including the interface box address, i.e. peripheral address, and the data, which are in turn transferred to bit by bit interface 12-1 as they are shifted out of register 212. This shifting is disabled when the register empty detector detects that register 212-3 is empty. Finally, the serially received bits are transferred to processor 10 in parallel, i.e., word four, via the conversion which takes place in interface 12-1.

There has accordingly been seen a system coupled with a processor including a plurality of interface boxes each coupled with one or more peripheral devices so as to transfer data therebetween. There has also been shown a feature of the invention wherein such interface boxes are coupled in a full duplex serial or daisy chained path with such processor so as to enable the transfer of input words to such processor and to receive an output word and a priority word from such processor for use thereby. It has also been seen that priority determination has been made so as to increase the throughput of the system by determining such priority in a data transfer cycle just prior to the data transfer affected. It has also been seen that such system has been implemented in a simple and fairly inexpensive manner by utilizing signals of three states, including a gap signal, so as to separate the words being transferred.

Having described the invention, what is claimed as new and novel and for which it is desired to secure Letters Patent is:

1. Priority determination apparatus for a data processing system comprising:
   A. a data processor;
   B. a plurality of serially coupled peripheral interface logic elements, each having an element address, a first of said elements coupled with said processor for receiving information serial by bit from said processor, and the remaining ones of said elements coupled with each other to receive said information serial by bit in a daisy chained arrangement from the preceding one of said elements, said information being transferred in data transfer cycles;
   C. wherein each of said interface logic elements includes
      1. a shift register coupled by means of the element in which such shift register is included, for receiving said information, said shift register including a plurality of stages, each having a different number assigned thereto;
      2. means for setting said stages to a first binary state prior to the shifing therein of said information during said data transfer cycles;

3. means coupled with said shift register for shifting a mark bit having a second binary state through the stages of said shift register prior to the shifting therein of said information during said data transfer cycles and after said stages have been set to a first binary state by said means for setting;
4. means for providing the element address of the respective element; and
5. comparator means, coupled with each of said stages of said shift register and coupled to receive the respective element address, for generating a priority signal when said element address compares with the number of that stage of said shift register which includes said mark bit therein.

2. Apparatus as in claim 1 further comprising:
A. means, included in each of said elements, for receiving an output word and a priority word from said processor; and wherein
B. said priority signal is generated during the presence of said priority word.

3. Apparatus as in claim 2 further comprising means responsive to said priority signal for enabling the respective interface logic element generating said priority signal to gain access for transfer of information with said processor during the next succeeding one of said data transfer cycles.

4. Apparatus as in claim 3 further comprising means for transferring at least one input word to said processor during each of said data transfer cycles.

5. Apparatus in claim 1 further comprising:
A. an input bus and an output bus included in the coupling between said interface logic elements and said processor, said busses coupled so that the one of said elements furthest from said processor has the lowest priority and coupled to provide full duplex data paths between said processor and said elements;
B. means, included in each of said elements, for receiving information from said processor on said output bus during each of said cycles;
C. means, included in each of said elements, for transferring information to said processor on said input bus during each of said cycles if said element is the highest priority interrupt requesting element as indicated by said priority signal; and
D. gate means, included in each of said elements, for inhibiting information transfer along said input bus by the elements having lower priority than the element generating said priority signal.

6. Apparatus as in claim 5 wherein as output word and a priority word are enabled for transfer over said output bus during each of said cycles and wherein at least one input word is enabled for transfer over said input bus during each of said cycles, and further comprising means, included in said comparator means and responsive to said mark bit during the transfer of said priority word and responsive to said priority signal, for enabling the respective interface logic element generating said priority signal to gain access for transfer of information with said processor during the next succeeding one of said data transfer cycles.

7. Priority determination apparatus comprising:
A. a data processor;
B. a plurality of peripheral interface logic elements, each of said elements having a unique address;
C. and output bus coupled from said processor in a serial, daisy chained manner, with each of said elements, said output bus coupled to transfer words in serial by bit form;
D. an input bus coupled to said processor in a serial, daisy chained manner from each of said elements, said input bus coupled to transfer words in serial by bit form, said busses arranged so that the one of said elements furthest away from said processor is the lowest priority element;
E. shift register means, included in each of said elements, for receiving by means of its element, said words serially by bit, said register including a plurality of stages each having a number assigned thereto, the number of which is at least equal to the number of said boxes;
F. means for shifting a mark bit, having a binary state different than the binary state in each of said stages, through each of said stages of said register;
G. means for comparing the unique address of said element with the number of the stage in which said mark bit has been shifted; and
H. means, responsive to said means for comparing, for generating a priority signal for the interface logic element in which a positive comparison first occurs between said unique address and said number of said stage.

8. Apparatus as in claim 7 further comprising means for inhibiting the transfer of words on said input bus from a lower priority element than said element generating said priority signal.

9. Apparatus as in claim 8 further comprising:
A. means for successively transferring an output word and then a priority word on said output bus and simultaneously therewith two input words on said input bus during a given interval of time; and
B. means, responsive to said means for comparing, for enabling the generation of said priority signal during the time of the transfer of said priority word on said output bus.

10. Apparatus as in claim 7 further comprising:
A. means for transferring words on said busses during successive data transfer cycles;
B. means for generating said priority signal during a latter protion of each of said data transfer cycles; and
C. means, responsive to said priority signal, for establishing the highest priority peripheral interface logic element for the next succeeding one of said data transfer cycles.

11. Apparatus as in claim 10 further comprising:
A. means for enabling the transfer of words over said input bus from the one of said elements generating said priority signal during any given data transfer cycle following the generation of said priority signal; and
B. means for enabling the transfer of words over said output bus to each of said element during said given data transfer cycle.

12. Apparatus as in claim 11 further comprising:
A. means, in each of said elements, for determining the one of said elements for which said words on said output bus are intended; and
B. means, in each of said elements, for transferring said words from the determined one of said interface logic elements to a peripheral device.

13. Apparatus as in claim 7 further comprising:
A. means for receiving a priority word on said output bus; and
B. means for inhibiting the transfer of said priority word to the ones of said interface logic elements further away from said processor on said output bus than the one of said elements generating said priority signal.

14. Apparatus as in claim 7 further comprising:
A. means included in each of said elements for receiving a priority word on said output bus, said priority word having a first signal state; and
B. means included in each of said elements for changing said first signal state of said priority word to a second signal state, said changing of said first state to said second state occurring only in the one of said elements generating said priority signal, wherein said second state of said priority word indicates to the ones of said elements further away on said bus that another interface logic element has priority for data transfer with said processor.

* * * * *